United States Patent [19]
Sekine

[11] Patent Number: 5,236,975
[45] Date of Patent: Aug. 17, 1993

[54] CONCRETE NON-CURE COATING MATERIAL, AS WELL AS CONCRETE PRODUCTS OR CONCRETE STRUCTURAL PRODUCTS WITH SURFACE PATTERN OR DECORATION USING SAID MATERIAL AND PRODUCTION PROCESS THEREFORE

[75] Inventor: Sukeyoshi Sekine, Fujinomiya, Japan

[73] Assignee: Kabushiki Kaisha Zokei, Fujinomiya, Japan

[21] Appl. No.: 781,681

[22] Filed: Oct. 24, 1991

Related U.S. Application Data

[63] Continuation-in-part of Ser. No. 531,532, May 31, 1990, abandoned.

[30] Foreign Application Priority Data

| Jun. 1, 1989 | [JP] | Japan | 1-139783 |
| Jun. 1, 1989 | [JP] | Japan | 1-139784 |
| Sep. 21, 1989 | [JP] | Japan | 1-245509 |
| Nov. 24, 1989 | [JP] | Japan | 1-305075 |
| Dec. 19, 1989 | [JP] | Japan | 1-329016 |
| Feb. 5, 1990 | [JP] | Japan | 2-25478 |
| Feb. 16, 1990 | [JP] | Japan | 2-35884 |
| Feb. 16, 1990 | [JP] | Japan | 2-35885 |

[51] Int. Cl.$^5$ .................. C08L 67/06; C08K 5/08; C08K 3/00
[52] U.S. Cl. .................. 523/510; 523/500; 523/515; 524/5; 524/347; 524/413
[58] Field of Search .............. 523/500, 515, 523, 526, 523/510; 524/413, 347, 469, 5; 525/57, 58

[56] References Cited

U.S. PATENT DOCUMENTS

| 3,326,845 | 6/1967 | Arens et al. | 523/513 |
| 4,050,943 | 9/1977 | Sondhe | 106/12 |
| 4,055,322 | 10/1977 | Cassidy | 249/187 |
| 4,148,841 | 4/1979 | Schwartz, Jr. et al. | 523/515 |
| 4,195,014 | 3/1980 | Dorfman et al. | 523/515 |
| 4,205,040 | 5/1980 | Aoyama et al. | 264/233 |
| 4,611,015 | 9/1986 | Hefner, Jr. et al. | 523/523 |
| 4,634,626 | 1/1987 | Yamaguchi et al. | 428/317.1 |
| 4,816,503 | 3/1989 | Cunningham et al. | 523/523 |
| 4,883,535 | 11/1989 | Hamaguchi et al. | 524/5 |
| 4,916,172 | 4/1990 | Hayashi et al. | 523/500 |

FOREIGN PATENT DOCUMENTS 0151611 9/1982 Japan ................ 523/523

OTHER PUBLICATIONS

Abstract-JP-A-59-154-254 (Sep. 1984).

*Primary Examiner*—Paul R. Michl
*Assistant Examiner*—Peter Szekely
*Attorney, Agent, or Firm*—Wenderoth, Lind & Ponack

[57] ABSTRACT

Disclosed is a concrete non-cure material for preventing the surface of cement mortar, which maintains contact with said material, from setting or hardening. This invention also discloses a concrete product or concrete structure with surface decorations produced by affixing the concrete non-cure material to the surface of the decorative material or to the inner surface of a form for a concrete molding and production methods therefor.

5 Claims, 13 Drawing Sheets

F I G. 20
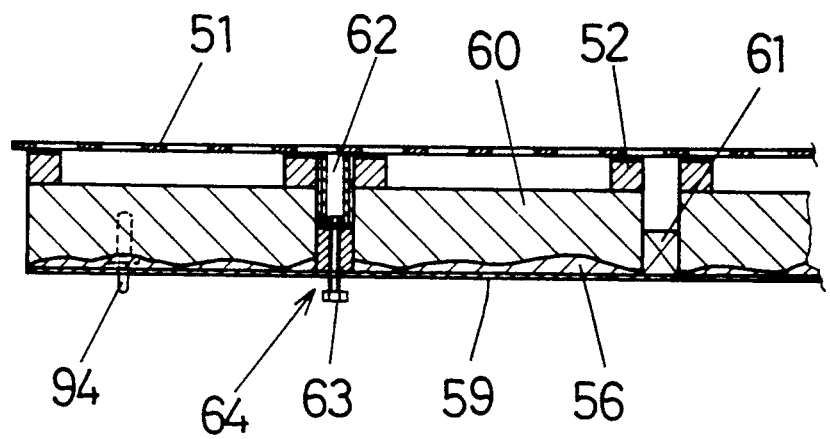
F I G. 21
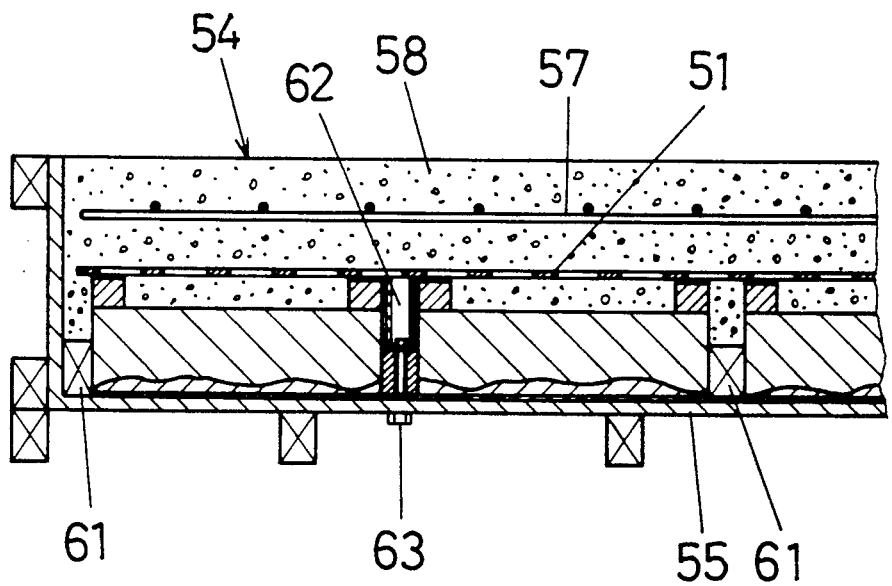
F I G. 22
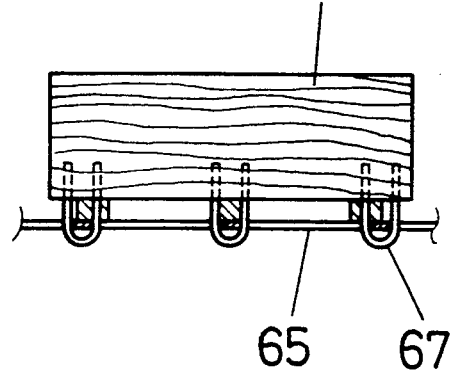

CONCRETE NON-CURE COATING MATERIAL, AS WELL AS CONCRETE PRODUCTS OR CONCRETE STRUCTURAL PRODUCTS WITH SURFACE PATTERN OR DECORATION USING SAID MATERIAL AND PRODUCTION PROCESS THEREFORE

This application is a continuation-in-part of now abandoned application Ser. No. 07/531,532 filed on May 31, 1990 now abandoned.

FIELD OF THE INVENTION

The present invention concerns a concrete non-cure material for preventing the surface of a cement mortar etc., which is in contact with said material, from setting or hardening. Further, the present invention also relates to a concrete product or a concrete structural product with surface patterning or decoration in which the concrete non-cure material is affixed to the surface of a decorative material or to the surface of a form to shape the concrete material as well as a process for the production thereof. The present invention also relates to a concrete block with a decorative material by using the concrete non-cure material in which the decorative material is secured to a concrete base.

The invention also relates to a process for producing a patterned or decorated surface of a concrete molding product using a form having a concrete non-cure material layer disposed on the surface and products produced thereby. Furthermore, the present invention also relates to a concrete structural product and a concrete structural product with surface pattern or decoration by using sand particles coated with concrete non-cure material, as well as a process for producing said product.

DESCRIPTION OF THE PRIOR ART

Although concrete cure retarders, which retard curing of the concrete to some extent have been previously used, concrete non-cure materials for preventing the surfaces of cement mortar, etc. from setting or hardening by maintaining contact of the non-cure materials with the cement mortar have not yet been developed.

Further, concrete products having a decorative material on the surface have been produced by laying the decorative material on the inner surface of a molding form by means of a concrete cure retarder, and appropriate concrete reinforcements placed in the inside of the mold placing concrete thereon. According to such method, an adhesive which can be defoliated or peeled upon swelling with water and paper or cloth impregnated with an acid is placed in the form, the form is filled with concrete and steam applied to cure the concrete. After leaving the concrete at normal temperature for about seven days, the form is removed and then a water washing step is applied to expose the aggregates in the concrete. Tile or glass is fixed, by means of a plastic sheet or vinyl sheet, to the inner surface of a form, or tile, etc. with a surface of the tile or glass fixed to the side of the form then filled by means of an adhesive tape, which is adhesive on both sides. A plastic resin joint is then fitted between each of the tiles, etc. and, after applying the required reinforcements, concrete is placed in the form and then uniformly an intensely packed by applying vibrations to the form. Then, after curing of the concrete by steam cure under heating, the form is removed and then the paper on the surface of the tile is peeled off by wetting with water, the synthetic resin at the joint portion is detached and, thereafter, mortar or cement paste is scraped off by means of a wire brush, etc.

As another method, concrete is placed in the form or mold after disposing the necessary reinforcements in the concrete in the form and the reinforced concrete packed by applying vibrations to the form. Then, after water, on the surface of the concrete, is drained, the mortar is thinly extended uniformly thereon and a decorative material, such as a slate, tile, brick, etc. is bonded thereon and cement mortar is grouted to the joint for the slate, etc. and then the surface of the slate is washed with water to complete the decorative surface.

Further, conventional concrete blocks with decorations may be produced in which anchors are disposed on the rear face of the decorative materials and are thrust into the concrete base to attach it thereto.

Further, in conventional solid concrete decorative products, the surface of the concrete is roughened by water washing while the concrete is not yet cured or the surface of the concrete is said casted after curing it.

Also, a cure retarder may be used, depending on the situation for maintaining the surface of the concrete uncured.

Moreover, in the case of forming a cavity for a pipe in a concrete structure after curing, concrete has been placed in a form after provisionally attaching a pipe made of styrofoam or paper in the form or mold to provide a spacing for the pipe.

Although a cure retarder can retard the cure of the concrete, it can not prevent the surface of cement mortar which is in touch with the cure retarder from setting or hardening. Accordingly, there are various problems in the production of concrete products by using a concrete cure retarder.

In the method of using a cure retarder, the retarder is often used on the surface of small, mass-produced concrete products, but the form has to be removed within the cure retarding period (that is, before curing of the concrete).

Accordingly, in the process of applying a steam cure before the removal of the form, the form has to be removed within a cure retarding period and water washing has to be applied. Thus, the removed products are produced unevenly because of the differences in the cure period and the timing of removal. Accordingly, this method cannot be adopted for structural materials requiring as much as two weeks before removal of the form.

Further, the process of scraping off cured cement paste deposited on the surface of decorative tiles, etc. after removal of the form, not only requires manual labor, but also involves a fear of injuring the surface of the decorative material.

Moreover, the process for manually arranging slates, tiles, etc. one by one, requires skilled techniques and requires a step of washing out contaminations at the surface of slates, etc. This often causes defoliation or peeling or makes the finishings to the joint areas non-uniform. When the method is applied to structural products, since the underlying concrete has often been cured already, it is necessary to dispose an underlying layer again with cement mortar to attach the ornamental slates and special measures must be taken to prevent peeling and removal of the decorative slates or tiles from the surface of the concrete.

A conventional concrete block with a decoration can be employed in a case where the decorative material is flat or the entire surface of the block is covered with the decorative material. However, it can not be used in the case of disposing a plurality of uneven decorative materials on the surface of the block or where a large amount of protrusions are provided for the decorative materials. In addition, the operation for securing anchors to attach the decorative materials to the concrete requires time and is labor-consuming. Further, in the case of conventional concrete blocks with decorations in which tiles, etc. are secured or deposited by using concrete or cement mortar, the cement mortar is deposited on the surface of the tiles, etc. so that it requires much time and labor for removal of the cement mortar from the tiles and may injure the surfaces of the tiles.

Further, in the conventional production of three-dimensional concrete decorative products, if the timing of the washing of the uncured concrete with water is too early after placing concrete in the mold, the concrete may be excessively flushed away, whereas if it is washed too late, removal of the required portion becomes difficult. Further, roughening or preparing the decorative surface on the concrete by means of sand blasting is not only time- and labor-consuming, but also may involve a risk of causing public pollution due to dusts and noises during fabrication. Also, the use of a cure retarder for a molded surface, requiring a form, involves a problem that the effect of the cure retarder is rapidly lost if the removal of the form is delayed due to the curing of the concrete main body or by failing to maintain the concrete in a predetermined uncured state until the removal of the form.

Also, in a conventional method of disposing a cavity for a piping space in the concrete structural product after curing, since the specific gravity of a tube made of styrofoam or paper used for forming the piping space is less than that of the concrete, (even if concrete is placed in the form after provisionally attaching the pipe to the form) the pipe rises upwardly so that it is difficult to obtain a concrete structural product having a piping space at a correctly desired position.

SUMMARY OF THE INVENTION

According to the present invention, there is provided a concrete non-cure material for preventing the surface of cement mortar in contact with said non-cure material, from setting or hardening. This non-cure material is a resin layer or powder made by hardening a liquid which is prepared by mixing an alkali-swollen agent or a water-swollen agent and a high water absorptive polymer and/or monomer. By use of such non-cure material, the aforementioned problems involved in connection with a concrete non-cure material can be eliminated. Further, concrete products or concrete structural products with a surface pattern or decoration, which could not be produced in the prior art, can be obtained by using the concrete non-cure material of the present invention.

In accordance with the present invention, since decorative materials are laid by way of a concrete non-cure material onto the inner surface of a form, removal of the decorative material is easy, even if more than several days have been elapsed after the removal of the form. Also, there is no fear that the cement mortar, etc. will be strongly cured and deposited on the surface of the decorative materials. Further, in the case of not using such decorative material and wherein a concrete non-cure material is attached to the inner surface of the form, the surface of the concrete in contact with the form is kept uncured even after a sufficient strength is developed in the concrete main body. Therefore, an uneven surface can easily be obtained by washing the surface with water after the removal of the form and the decorative material or other like surface patterning can be easily attached to the concrete. Thus, a conventional operation of mechanically roughening the surface of the concrete is no longer necessary.

The present invention can eliminate the problems in the prior art by provisionally attaching decorative materials by way of a concrete non-cure material and has succeeded in the mass production of concrete products or concrete structural products with a plurality of decorative materials.

Further, the present invention can overcome the foregoing problems in the prior art by provisionally attaching decorative materials by way of a concrete non-cure material layer to the inner surface of a form. Alternatively, a concrete non-cure material layer may be applied to the inner surface of the mold without attaching the decorative material, placing concrete on the inside of the form, maintaining the concrete in touch with the concrete non-cure material layer in an uncured state, then removing said uncured surface by water washing, and further attaching the decorative material, if desired.

The present invention has likewise succeeded in obtaining a concrete structural product capable of easily producing a piping space, etc. therein after curing of the concrete, by mixing sand particles, coated with the concrete non-cure material, with the concrete, and then forming a pipe spacing in the concrete followed by solidification.

Furthermore, the present invention has succeeded in making it possible to produce concrete products or concrete structural products, such as concrete blocks having a plurality of decorative material, in three dimensions, by securing to a predetermined depth in the concrete an embedding agent that can be removed by water washing, provisionally attaching the decorative materials, and removing the embedding agent by water washing after the cure of the concrete.

According to the present invention, there is provided a concrete non-cure material for preventing the surface of cement mortar, etc. from setting or hardening when contacted therewith.

The non-cure material of the present invention comprises a resin layer or powder made by hardening a liquid prepared by mixing an alkali-swollen agent or a water-swollen agent and a high water absorptive polymer and/or monomer. Also, the alkali-swollen agent comprises a thermosetting polyester, a polyvinyl alcohol and a polyvinyl acetal and the water-swollen agent comprises a vinyl acetate resin. The mixing ratio of the alkali-swollen or water-swollen agent and the high water absorptive polymer and/or monomer is from 20 to 80% of the high water absorptive polymer and/or monomer based on the entire amount (by volume). Further, a concrete non-cure material layer is formed by means of coating or spraying in a case of liquid, while the concrete non-cure material layer is formed by mixing with a water soluble adhesive or with an adhesive and then coating in the case of a powder.

Also, the present invention provides a process for producing a concrete product with a surface decoration, which comprises provisionally attaching a decorative material to the inner surface of a form by way of a concrete non-cure material layer, applying a provisionally grouting treatment to the joint portion of each decorative material, incorporating reinforcements as required, then placing and curing the concrete in the form, removing the form and then removing the concrete non-cure material layer on the surface of the decorative material.

The present invention also provides a process for producing a concrete structure with a surface decoration, which comprises, upon constructing a concrete structure, fixing a concrete non-cure material layer to each of the inner surfaces of an inner form and an outer form thereof, or provisionally attaching the decorative material by way of the concrete non-cure material layer, applying provisional grouting to the joint portion for each of the decorative materials and incorporating the necessary reinforcements between the inner form and the outer form. Then, after placing concrete in the form, the concrete non-cure material and uncured concrete are removed from the form.

Likewise, the present invention provides a process for providing the surface of a concrete molding product with surface decorations, which comprises provisionally attaching a decorative material to the inner surface of a form, disposing a concrete non-cure material layer to the surface of said decorative material, placing a concrete on the inside of the form, removing the form after the cure of the concrete and then washing the surface of the concrete with water, thereby removing the uncured concrete.

Further, the present invention provides a process for producing a concrete product with a surface decoration, which comprises coating a concrete non-cure material layer to the inner wall of a box-like form, laying decorative materials, by way of joint materials, incorporating reinforcements up to a predetermined height, placing a concrete in the form, removing the form after the cure of the concrete, washing the surface of the decorative material with water and removing the joint materials.

The aforementioned inner wall of the form is a bottom wall or a side wall.

Similarly, the present invention provides a process for producing a concrete product or concrete structure with surface decorations, which comprises attaching decorative materials at a predetermined distance to the outside of a cylindrical support, fixing said support with the decorative materials by way of a concrete non-cure material layer between the outer surface of each of the decorative materials and the inner surface of the form, incorporating reinforcements to the inside of said support, placing concrete in the form, removing the form after the cure of the concrete, and then removing the uncured concrete on the concrete wall surface by water washing.

The present invention also provides a process for producing a concrete product with surface decorations, which comprises disposing decorative materials side by side on a porous support, setting the decorative materials in a form with the support being upside, grouting a concrete non-cure material layer or sodium silicate resin into a gap between the bottom wall of the form and the decorative material, incorporating reinforcements above the support in the form, placing concrete in the form, removing the form after the curing of the concrete and then removing the concrete non-cure material layer or sodium silicate resin by water washing.

Also, the present invention provides a process for producing a concrete product with surface decorations which comprises disposing decorative materials side by side on a porous support by way of a spacer, setting the decorative materials in a form with the support being upside, disposing an optional number of height controlling spacers at an appropriate position of said support, thereby controlling the height of the support, grouting a concrete non-cure material layer or sodium silicate resin between the bottom wall of said form and the surface of said decorative materials, incorporating reinforcements above the support materials, placing concrete with the form, removing the form after the cure of the concrete and then removing said concrete non-cure material layer or sodium silicate resin by water washing.

The present invention similarly provides a process for producing a concrete product with surface decorations, which comprises securing wooden blocks each by a fixing means on a support, inserting a group of wooden blocks in a form with the support being upside, disposing a concrete non-cure material layer to the surface of the group of said wooden blocks, grouting sodium silicate resin into the joint portion for each of the wooden blocks, incorporating reinforcements in said form, placing concrete, removing the form after the cure of the concrete and then removing the concrete non-cure material layer at the surface of the wooden block by water washing.

The aforementioned decorative materials can be made of stone, sintered products, tile, metal materials, glass or wooden blocks. Also, the support can be made of mesh plates, punched metals, expansion metals, metal wire-lattice plates, resin mesh plates, glass fiber mesh plates or carbon mesh plates.

Further, the aforementioned height-controlling spacer comprises a support cylinder and a bolt or device for controlling the height of said supporting cylinder.

Besides, the present invention provides a process for producing the surface of a concrete molding product at the joint portions, which comprises disposing a concrete non-cure material layer to the inner surface of a form of a concrete structure which forms a secondary placing side, placing concrete inside the form, and removing the uncured concrete by water washing from the surface of the concrete after removal of the form.

The present invention also provides a process for producing the surface of a concrete molding product with surface decorations, which comprises disposing a cylindrical form having a concrete non-cure material layer disposed to the outer wall thereof into a form for a concrete structure, placing concrete between said cylindrical form and the form or mold for the structure, removing the forms after the cure of the concrete and water washing the surface with the cylindrical form, thereby removing the uncured concrete.

The aforementioned cylindrical form is a circular cylindrical or cylindrical form with a section having a square shape.

The present invention likewise provides a process for producing a patterned or decorative surface of a concrete molding product, which comprises incorporating a reinforcement in a cylindrical form having a concrete non-cure material layer attached to the inner wall thereof, placing concrete in the form, removing the form after the cure of the concrete and then water washing the outer wall of said concrete construction, thereby removing the uncured concrete.

The aforementioned cylindrical form is a circular cylindrical, or a cylinder having a square, triangular, hexagonal or octagonal section.

The present invention similarly provides a molding decorative material on the surface of a concrete molding product, wherein a concrete maintained uncured by the concrete non-cure material layer deposited on the surface of concrete is removed by water washing, thereby developing a three-dimensional pattern.

The present invention also provides a concrete structure prepared by coating sand particles with a concrete non-cure materials, mixing these materials with concrete and then compressing and curing the mixture.

Likewise, the present invention provides a process for producing a concrete structure with surface decorations, which comprises scattering sand particles or gravel coated with the concrete non-cure material on the surface of the concrete, before curing, and then water washing the surface of concrete after curing the concrete.

Also, the present invention provides a concrete non-cure material, which is an embedding agent comprising a mixture of sodium silicate and a curing agent incorporated with a reinforcing agent and which is removable by water washing from the concrete.

Besides, the present invention provides a process for producing a concrete product or concrete structure with surface decorations, which comprises disposing a plurality of decorative materials on a bottom plate of a box-like form or mold, grouting an embedding agent to a predetermined depth into a gap between said bottom plate and said decorative materials, incorporating reinforcements above said decorative materials, placing concrete therein, removing the form after curing the concrete and then removing the embedding agent between said decorative materials by water washing.

The aforementioned decorative material comprises stone materials, sintered products, tiles, metal materials, glass or wooden blocks.

Further, the aforementioned concrete product or concrete structure with surface decorations comprises concrete blocks, concrete curtain walls, concrete centrifugal compaction products, concrete squares, or cylindrical pipes, or concrete box-culverts, etc. all of them having surface patterns or decorations.

The concrete non-cure material includes the following materials.

(1) A curing film layer prepared by mixing a high water sorptive polymer dissolved in an organic solvent with an alkali-swollen resin, mixing them with a curing agent and then coating or spraying the mixture, followed by curing.

(2) A water-swollen resin film layer incorporated with a water absorptive polymer prepared by mixing a monomer with a resin swollen by water and then coating or spraying the mixture with the addition of a curing agent, followed by curing.

(3) An alkali-swollen resin film layer incorporated with a water absorptive polymer prepared by mixing an alkali swollen resin with a monomer, coating or blowing the mixture with the addition of a curing agent, followed by curing.

(4) A coating material prepared from the above and formed into a sheet-like state.

(5) A coating material prepared by curing, pulverizing or powderizing the resin described above, which is kneaded with an adhesive swollen with or dissolved in water or kneaded with an adhesive and then spraying or coating the mixture onto a form or mold, followed by drying or curing.

(6) A cured film layer prepared by mixing under stirring a high water absorptive polymer and a monomer with an alkali-swollen resin, coating or spraying them with addition of a curing agent, followed by curing.

(7) A powder prepared by mixing a monomer with an alkali-swollen agent and then cured with addition of a curing agent.

(8) A powderized cured film layer prepared by mixing an alkali-swollen resin or water swollen resin with a high water absorptive polymer, mixing these materials with a curing agent, followed by curing.

Each of the materials, as described above, has water absorbability, loses its stability upon initiation of water absorption and continues in an unstable state for a long period of time.

The aforementioned monomer used for preparing the concrete non-cured material of the present invention is 2-hydroxyethyl methacrylate monomer, and the polymer is the polymerized monomer.

In the case of using a non-cure material layer comprising 50% of the high water absorptive polymer or monomer, a depth to about 3 mm from the surface of the concrete is rendered uncured. Further, when a non-cure material layer comprising 80% of the high water absorptive polymer or monomer is used, a depth up to 5 mm from the surface of the concrete is rendered uncured.

Further, a non-cure material layer comprising 30% of a high water absorptive polymer or monomer maintains to a depth of about 1 to 2 mm the surface of the concrete in an uncured state.

As to the alkali-swollen resin or water-swollen resin described above, those easily swollen with an alkali or water, such as to maintain it in an unstable state with polymeric water-absorbing materials are preferred, such as thermosetting polyesters, polyvinyl alcohols and polyvinyl acetals as alkali-swollen resins or vinyl acetate resins as water-swollen resins to produce optimum results.

If the amount of the high absorptive polymer and monomer added is less than 20%, the cure instability is reduced, thereby failing to attain the objectives of the present invention. On the other hand, since it is not necessary to increase the content of the polymer or monomer more than 80%, the preferred amount of the high water absorptive polymer or monomer incorporated is from 20 to 80%. Further, the concrete non-cure material layer according to the present invention may be scattered in the form of a powder in an appropriate amount to the surface of the concrete upon use, so that it can be utilized also in a case of not using a form (for example, in the formation of a pavement, a horizontal decorative or patterning surface, etc.). In this case, it is necessary to apply an appropriate pressure to the surface of the concrete.

The concrete non-cure material according to the present invention is either an alkali-swollen resin film layer incorporated with a water absorptive polymer or a water-swollen resin film layer incorporated with a water absorptive polymer so that it has the effect of causing swelling by absorption of the alkaline materials or water in the concrete. This hinders the crystalline growth of the cement at the portion which is in touch with said concrete non-cure material.

In the present invention, since the concrete non-cure material is affixed at the inner surface of a form or between the inner surface of the form and the decorative material, it has the effect of keeping the cement mortar or the cement paste uncured at the outer surface of concrete or the outer surface of the decorative material until the removal of the form. Accordingly, it has an effect of making it possible to effectively pattern the surface of concrete or producing concrete products with decorative materials.

In the present invention, since the decorative material is attached by way of the concrete non-cure material, a concrete product with a plurality of decorative materials can be obtained by washing the decorative material with water after the removal of the form. The concrete non-cure material can easily be removed by washing with water at a pressure of 70 kg/cm².

Further, by producing decorative materials in a perforated plate and fixing them in the form, the invention can provide the effect of arranging the decorative materials at predetermined positions when the concrete main body has cured and of obtaining concrete materials with an interior finish and an exterior finish simultaneously.

Further, since the decorative materials are disposed side by side by way of a space to a porous support plate, it has the effect of suspending them upwardly to a uniform height, even if the thickness of the decorative material varies and is capable of developing an uneven pattern on the side of the surface of concrete products. In the prior art, since a spacer sand or foamed material has to be put on the surface side of the decorative material for attaining such a state, it has been laborious and time-consuming, and has required a highly skilled technique. In the present invention, however, one may produce the decorative materials with ease. Further, in a case of securing the decorative materials in a state provisionally attached to the film on a support plate, since the arrangement of the decorative materials can be determined at a high accuracy upon provisional attachment, patterns can be drawn on a plurality of decorative materials. Furthermore, in the case of using a wooden block, it is possible to make the operation more effective and improve the product without contaminating the wood grains by cement paste, etc.

Moreover, when a height-controlling device for the support plate is disposed, the height of the decorative material can be controlled without the necessity of applying a high load of concrete to the decorative material.

In accordance with the present invention, since the concrete is placed, by way of a concrete material, to the inner surface of a form, the surface of the finished concrete remains uncured after removal of the form. Then, by washing the surface of the finished concrete with water, the uncured concrete is flushed away to provide an effect of forming a roughened surface with fine unevenness or an uneven decorative or patterning surface at the finished concrete surface.

The process according to the present invention has the effect of producing homogeneous concrete molding decorative products with uneven decorative or patterning surfaces easily without requiring skill and at decreased labor, etc. Further, the roughening for the concrete surface at the required position can be obtained with water washing after the removal of a form and it is effective irrespective of the timing for removing the form.

In addition, the present invention can provide an effect of disposing a vacant hole for piping, etc. with a uniform diameter throughout the length to be formed into concrete structural products as well as the roughening of the wall surface of said hole. Further, it has also an effect capable of easily roughening the outer surface of a circular or cylindrical shape pillars with square sections located thereupon.

According to the present invention, since the concrete non-cure material layer is deposited on the inner surface of a form, the surface of concrete in contact therewith always remains uncured. Further, since the concrete at the surface of the concrete molding products according to the present invention is in touch with the concrete non-cure material layer and always remains uncured, it can be removed by water washing and the surface is roughened to produce a decorative material. This roughening can make adherence, upon jointing, satisfactory upon joining other decorative materials thereto.

Further, the present invention has succeeded in obtaining concrete structural products in which piping space, etc. can easily be obtained in the concrete after curing the concrete by coating sand particles with the concrete non-cure material and mixing them with concrete forming a piping space thereon and solidifying the assembly.

Further, in accordance with the present invention, concrete structural products requiring no form (for example, pavements or horizontal decorative or patterning surfaces) can be effectively produced by scattering sand particles or gravel coated with the concrete non-cure materials on the concrete-formed surface and washing the concrete surfaces with water after curing the concrete.

Furthermore, in accordance with the present invention, mass production of concrete products having a plurality of decorative materials can be produced by securing to the concrete, at a predetermined thickness, an embedding agent that can be removed with water washing, provisionally attaching decorative materials thereto, and removing the embedding agent by water washing after curing the concrete. The depth of the gap between each of the decorative materials in this case can optionally be selected within a range of the thickness of the decorative materials. Further, the embedding agent can be easily flushed out with water under a pressure of about 70 kg/cm².

As the embedding agent, those materials, which are liquid upon grouting, solidify relatively easily and can be removed easily by water washing are preferred. For instance, sodium silicate is used as the main component, to which a curing agent mixed at a 1:1 ratio to form an embedding agent. As the curing agent, there can be mentioned, for example, inorganic acidic salts ($NaHSO_4$, $NaHCO_3$, $NaH_2PO_4$, $KH_1SO_4$, $Na_2HPO_4$). Further the curing agents are usually incorporated with about 5% to 40% of a reinforcing agent for adjusting the hardness. As the reinforcing agent, there can be mentioned a hardness adjusting agent for sodium silicate (for example, glyoxal, tributyrolactone, propylene carbonate and citric acid.)

DESCRIPTION OF THE ACCOMPANYING DRAWINGS

FIG. 20 is an enlarged cross sectional view for a portion of an embodiment using a height controlling spacer;

FIG. 21 is a cross sectional view for a portion of the embodiment shown in FIG. 20 placed in a form;

FIG. 22 is a cross sectional view in which a wooden block is secured to a support;

DESCRIPTION OF PREFERRED EMBODIMENTS

Example 1

Figure 1:
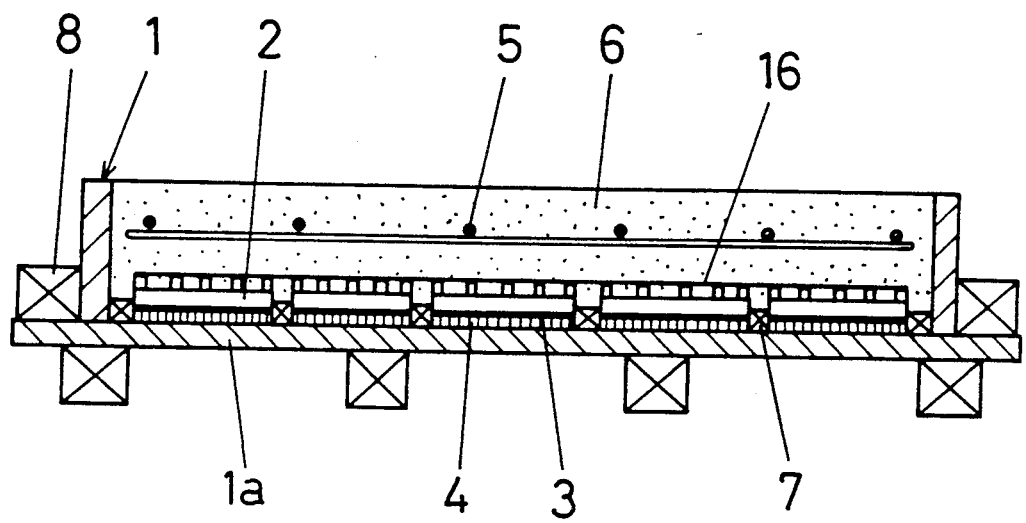
FIG. 1 is a cross sectional view of a concrete product produced according to the present invention before removal of a form.
Figure 2:
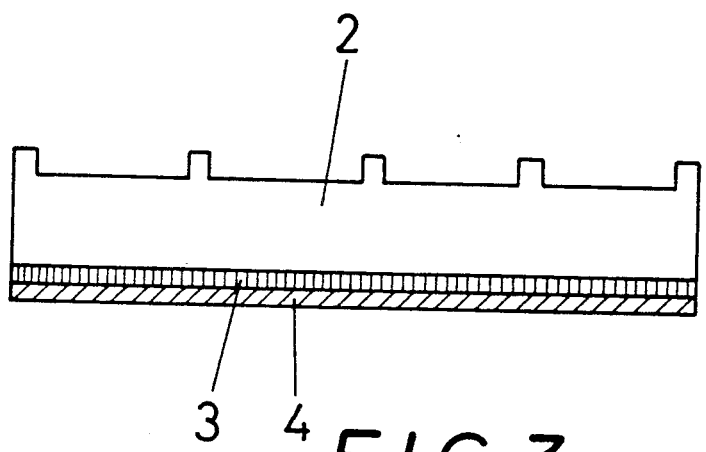
FIG. 2 is an enlarged cross sectional view for a tile.

The present invention will be explained by way of its preferred embodiment referring to FIGS. 1 and 2.

A releasing agent layer 3 is affixed to the surface of tiles 2 laid on the inner surface of a form 1 and, after drying, a concrete non-cure material layer 4 comprising a mixture of 60 parts of a polyester resin and 40 parts of a monomer and incorporated with 1 to 5 parts of a mixture comprising 55% of methyl ethyl ketone peroxide and 45% of a dimethyl phthalate as a curing agent is coated on the upper surface thereof (about 1 mm thickness), and the surface of the tile 2 is appended to the bottom 1a of the form 1 by using a double sided adhesive tape (having adhesives on both sides). Then, concrete reinforcements 5 are disposed in the form 1 and concrete 6 is placed thereon. In such a state, the form 1 is vibrated with a known machine to compact the filled concrete. In the drawing 7 is a joint material such as joint strip, formed resin or rubber. 8 is an outer form and 16 is a collecting mesh. When the concrete is steam-cured in the form 1 to improve the strength and when the form is removed and the surface of the tile 2 is washed with water, the deposited cement can be flushed away easily.

Example 2

Another embodiment of the present invention will be explained referring to FIGS. 3 through 5.

Figure 3:
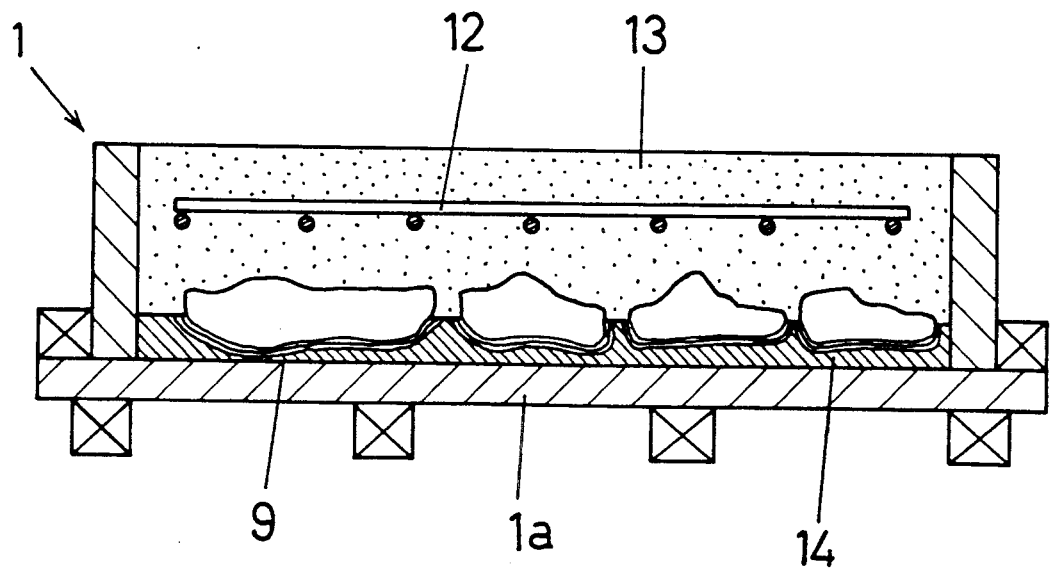
FIG. 3 is a cross sectional view of another embodiment of the present invention before removal of a form.
Figure 4:
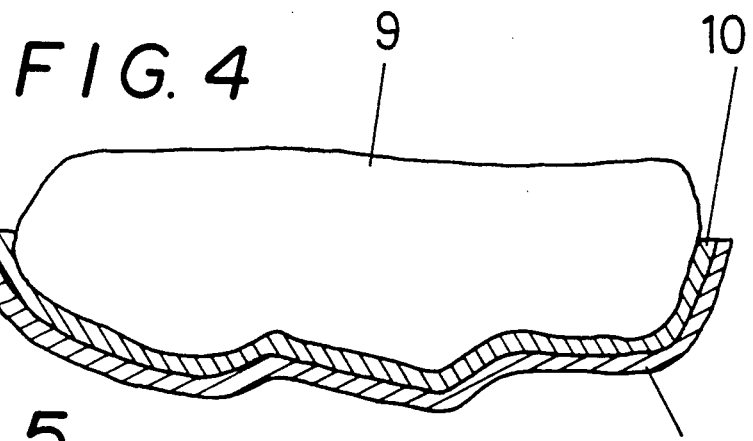
FIG. 4 is a cross sectional view of a stone material.

In FIGS. 3 and 4, a releasing agent layer 10 is disposed on one surface of stone material 9 (on the side of the bottom plate 1a of the form 1) and, after drying, a concrete non-cure material layer 11 comprising a mixture of 90 parts of polyvinyl alcohol and 10 parts of a water absorbing polymer is affixed thereto. The stone material 9 is laid in the form 1 by way of a stone fixing resin 14. Then, concrete reinforcements 12 are arranged by a required amount above the stone material 9 and then concrete 13 is placed in the form 1. The form 1 is vibrated as required and left as it is to cure the concrete 13 (for example, for seven days). Then, the form is removed and the surface of the stone material 9 is washed with water to remove deposits, such as uncured concrete, to obtain a concrete product according to the present invention.

Figure 5:
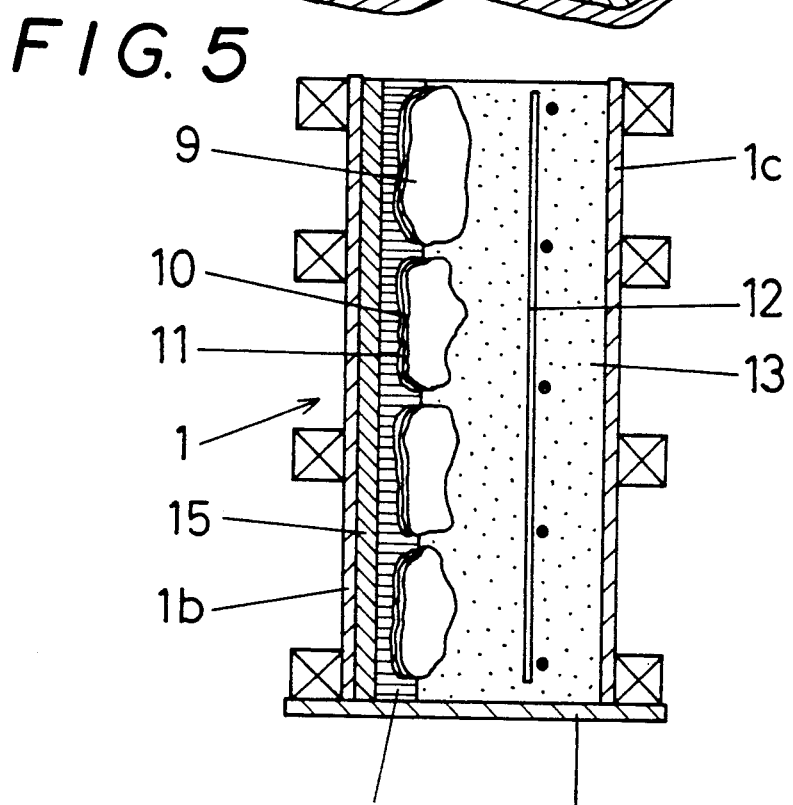
FIG. 5 is a cross sectional view of an embodiment of constructing a wall structure.

FIG. 5 shows the production of a concrete structure.

As described above, a releasing agent layer 10 is formed on the surface of one side of a stone material 9 and, after drying, the same concrete non-cure material layer 11, as described above, is disposed on the upper surface. The stone material 9 is arranged and fixed by way of a stone fixing resin or joint filler 14 to a stone fixing plate 15, which is fixed to the inside of a side frame 1b of the form 1. Concrete reinforcements 12 are arranged in a required amount and then the concrete 13 is placed between the stone material 9 and the other side frame 1c and the bottom frame 1a. After the cure of the concrete, the form is removed and the surface of the stone material 9 is washed with water to remove the uncured concrete to obtain a concrete structure with decorative materials according to the present invention. In this embodiment, if the stone material is heavy and large, a stone material fixing plate and a fixing resin are used so as not to displace the position thereon.

Example 3

Figure 6:
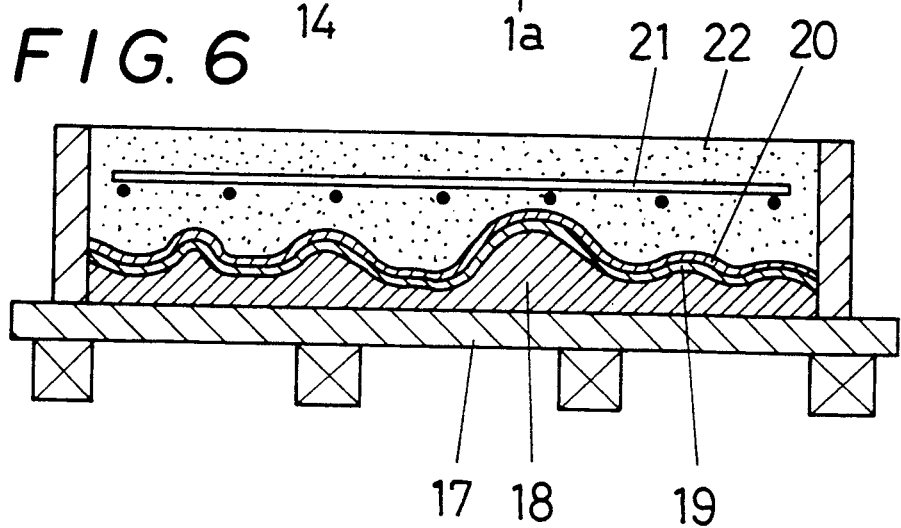
FIG. 6 is a cross sectional view in an intermediate step of another embodiment.
Figure 7:
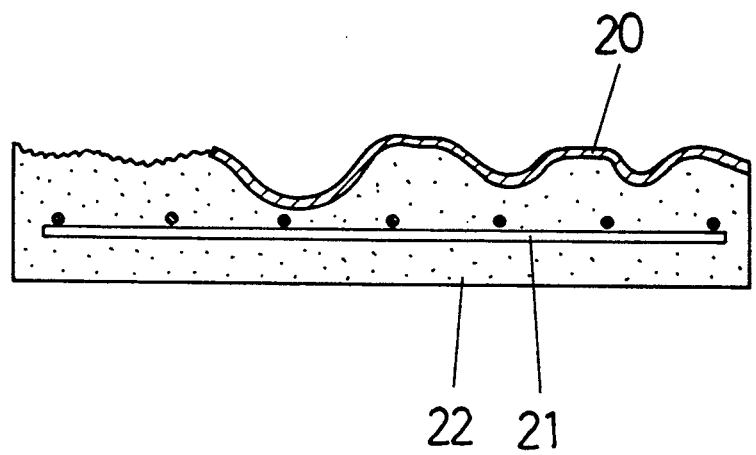
FIG. 7 is a cross sectional view thereof upon removal of a form.

The process of the present invention will be explained referring to an embodiment shown in FIGS. 6 and 7.

A female form 18 disposed in a form 17. After disposing a releasing agent layer 19 to the surface of the female form 18 and disposing a concrete material layer 20 to the surface of the releasing agent layer 19, concrete reinforcements 21 are assembled at an appropriate height and then the concrete 22 is placed into the form 17. After the cure of the concrete, the form is removed (FIG. 7) and when the concrete non-cure material layer 20 and the uncured concrete are removed with water washing (upper surface on the left in FIG. 7), a portion of appropriate aggregates are exposed to the surface and a concrete molding decorative material with decorative material (for example, pebble stone) are exposed and combined with the concrete to form a structure with an uneven shape.

Example 4

Figure 8:
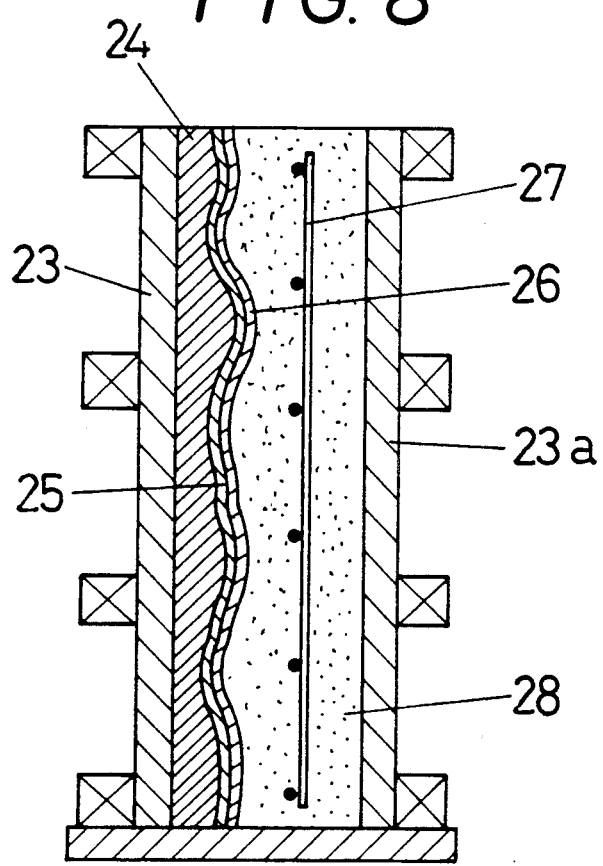
FIG. 8 is a cross sectional view in an intermediate step of another embodiment.
Figure 9:
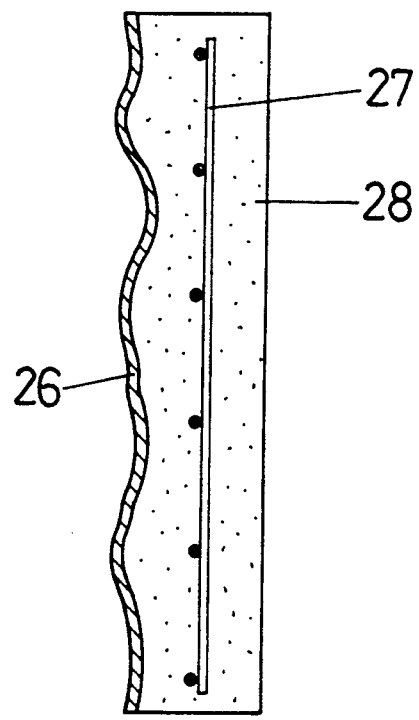
FIG. 9 is a cross sectional view upon removal of a form thereof.

The process according to the present invention will be explained referring to an embodiment shown in FIGS. 8 and 9.

A female form 24 is fixed to the inner surface of one form 23. Then, a releasing agent layer 25 is affixed on the inner surface of a female form 24, a concrete non-cure material layer 26 is affixed to the inner surface of the releasing agent layer 25, concrete reinforcements 27 are assembled between the concrete non-cure material layer 26 and the other form 23a and concrete 28 is placed into a gap between the frames 23 and 23a. When the concrete 28 is cured, the form is removed. In this case, since the form removal occurs along the releasing agent layer 25, a concrete molding decorative product can be finished by removing the concrete non-cure material layer 26 and removing the uncured concrete on the surface of the concrete with water washing. This embodiment can be applied, for example, in a case of forming a vertical concrete wall surface.

Explanations have been made in both of examples 3 and 4 in a case of using the female forms 18 and 24, but the female forms 18 and 24 are not always required. In the case of attaching the concrete non-cure material layer to the inner surface (or the bottom surface) of the form, a substantially flat or roughened surface can be obtained entirely by applying water washing after the removal of the form. That is, a female form is used for providing an aesthetic surface by molding, but a female form is not necessary for obtaining a slightly uneven surface for the entire part. Further, the ratio of mixing of the water absorbing resin or the thickness of the concrete non-cure material layer is adjusted, depending on the depth of the desired unevenness at the surface of the obtained concrete.

Although the explanations have been made for a concrete molding decorative product of a predetermined size, an uneven pattern can be molded entirely or partially on the surface of the concrete structure.

Example 5

Figure 10:
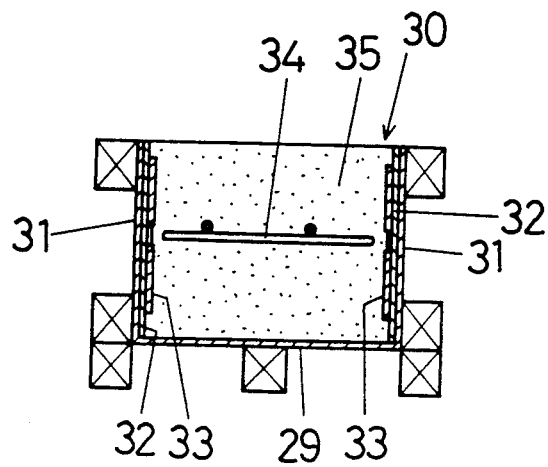
FIG. 10 is a cross sectional view in the course of applying a concrete block provisionally adhered with tiles on the sides during the step of an embodiment of the present invention.

In the embodiment shown in FIG. 10, a concrete non-cure material layer 32 is coated on the inner wall of side plates 31, 31 of a form 30 disposed vertically on a bottom plate 29. Then, after provisionally attaching tiles 33 to the inside of the concrete non-cure material layer 32, concrete reinforcements 34 are incorporated at an appropriate portion in the form 30 and then concrete 35 is added. Subsequently, after normal temperature curing or steam curing, when the form is removed and the concrete non-cure material layer is removed by water washing, a concrete block, with a decorative material attached, can be obtained.

Figure 11:
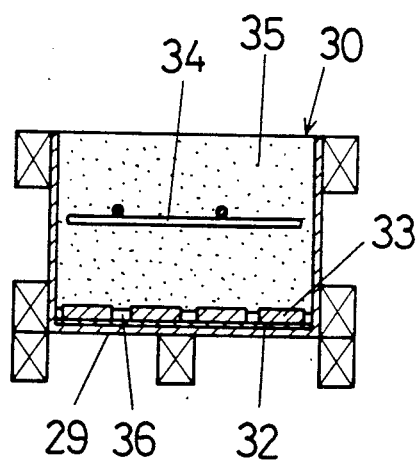
FIG. 11 is a cross sectional view in an intermediate step of an embodiment in which tiles are provisionally adhered on the bottom of a form.

In FIG. 11, a concrete non-cure material layer 32 is disposed on a bottom plate 29 of a form 30, tiles 33 are provisionally attached to the inner surface of the concrete non-cure material layer 32, joining material 36 are inserted, reinforcements 34 are appropriately incorporated and then concrete 35 is added to the form. Then, after normal temperature curing or steam curing, when the form is removed and the concrete non-cure material layer is removed by water washing, a concrete block, with a decorative material attached, can be obtained.

Example 6

Figure 12:
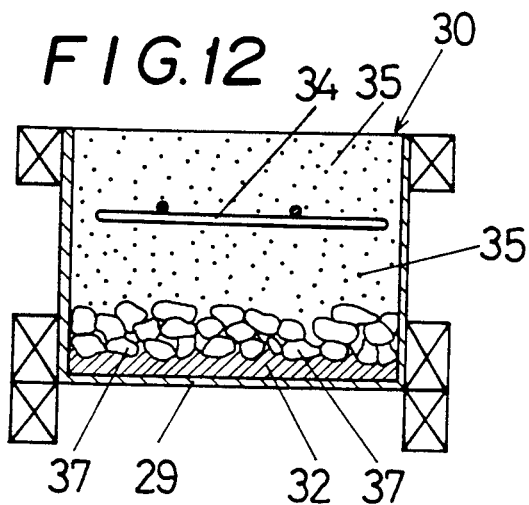
FIG. 12 is a cross sectional view in an intermediate step of an embodiment using stone materials.
Figure 13:
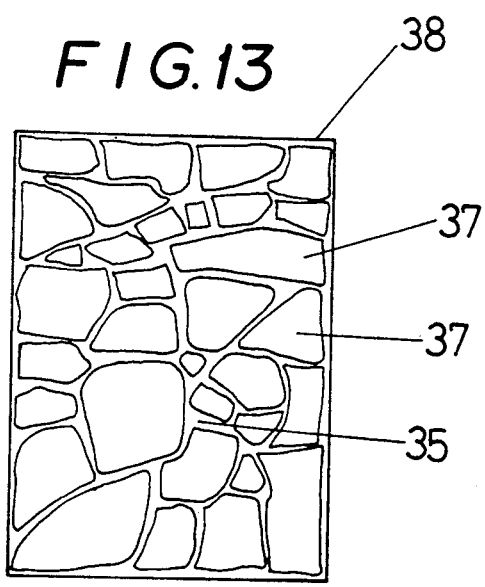
FIG. 13 is a plan view of a product thereof.
Figure 14:
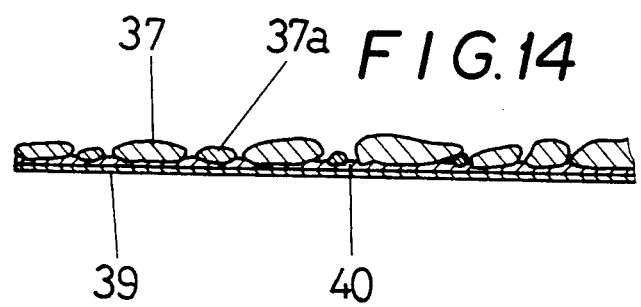
FIG. 14 is a cross sectional view for a portion of a sheet appended with stone materials.

In this embodiment, a concrete non-cure material layer 32 is disposed on a bottom plate 29 of a form 30 and stone materials 37, 37 are provisionally attached thereon as shown in FIGS. 12 and 13. Then, after incorporating concrete reinforcements 34, concrete 35 is placed thereon. After normal temperature curing or steam curing, when the form is removed and the surface of the stone materials 37, 37 is washed with water to remove the concrete non-cure material layer and uncured concrete are removed, a concrete block 38 having patterned stone materials 37, 37 can be obtained.

In this embodiment, a concrete non-cure material layer 32 alternatively may be prepared by kneading a powder of concrete non-cure material with an adhesive or with an adhesive which is soluble in water or alkali water and stone materials 37, 37 are provisionally attached by it.

In this embodiment, if the protruding amount of stone materials 37 of different size is made substantially constant, the stone materials 37, 37a are adhered to a sheet 39 (which alternatively may be a mesh) by way of a concrete non-cure material layer 40, which are set as they are into a form 30 and then applied with subsequent procedures as described above.

Example 7

The present invention will be explained referring to other embodiments shown in FIGS. 15 through 17.

After securing tiles 44 side by side to a square cylindrical form mesh plate 41 by way of a spacer 42 and under the presence of joining material 43 and providing a concrete non-cure covering material 45 to the surface of the tiles 44, a form 46 is attached to the outer side thereof. Then after disposing concrete reinforcements 47 to the inside, the form is filled with concrete 48. After the cure of the concrete, when the form is removed and the surface of the tiles 44 is washed with water to remove the uncured concrete, a reinforced concrete post 49 decorated with tiles can be obtained.

Figure 15:
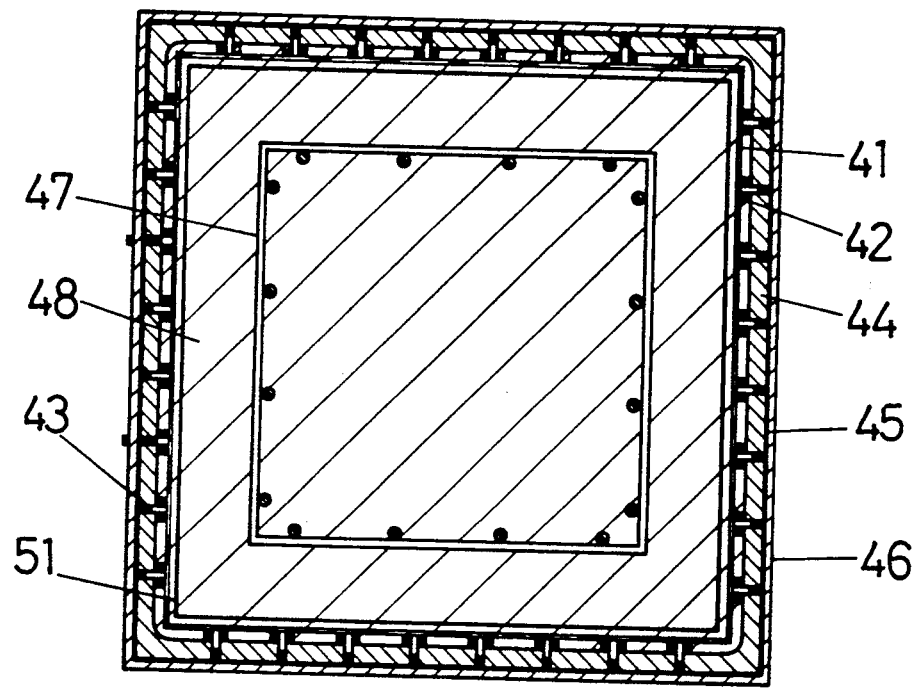
FIG. 15 is a transversal plan view in an intermediate step of another embodiment.
Figure 16:
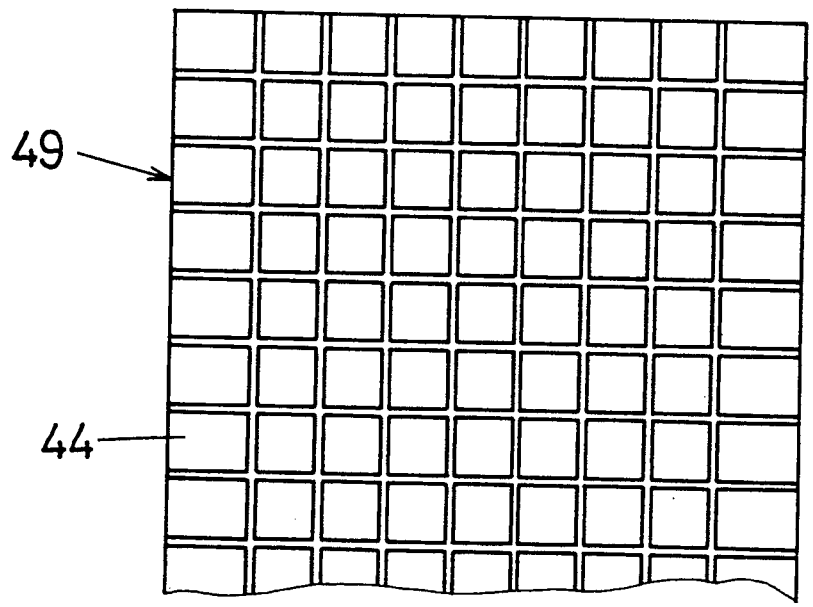
FIG. 16 is a front elevational view for a portion of the product.
Figure 17:
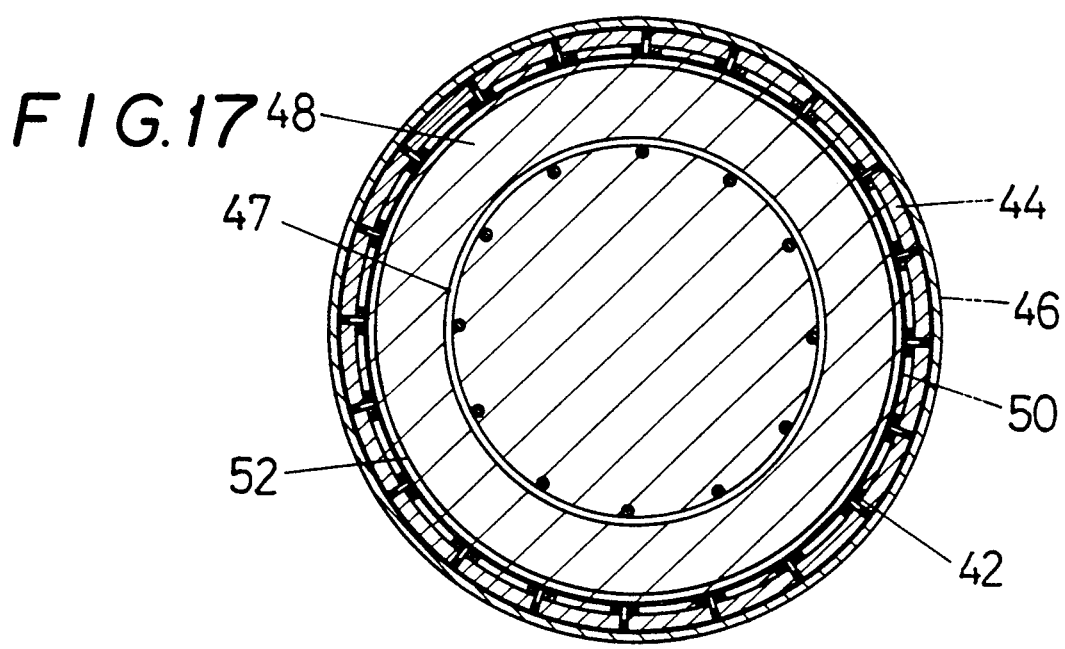
FIG. 17 is a transversal plan view in an intermediate step in the case of producing a cylindrical pillar product.

The square cylindrical form mesh plate 41 in the embodiment shown in FIG. 15, is displaced with a circular cylindrical form mesh plate 50 as shown in FIG. 17 Since the production process for the embodiment in FIG. 17 is identical to that in FIG. 15, with the exception that the shape is cylindrical detailed explanations therefor are omitted. In the drawing 51, 52 denote a metal gauge for securing tiles collectively.

In the foregoing embodiment, since the tiles are arranged on a mesh plate, the tiles can be maintained at an exact position relative to each other and adhered reliably thereby free from peeling or marring of the tiles or other like accidents.

Example 8

Figure 18:
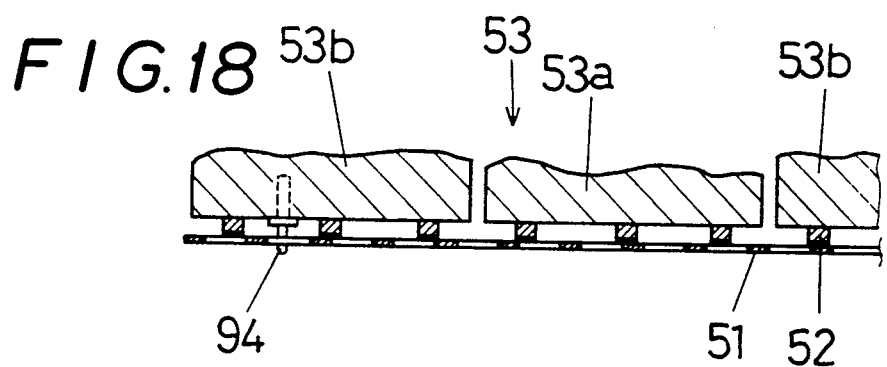
FIG. 18 is a cross sectional view for a portion of another embodiment in which decorative material is fixed to a support.
Figure 19:
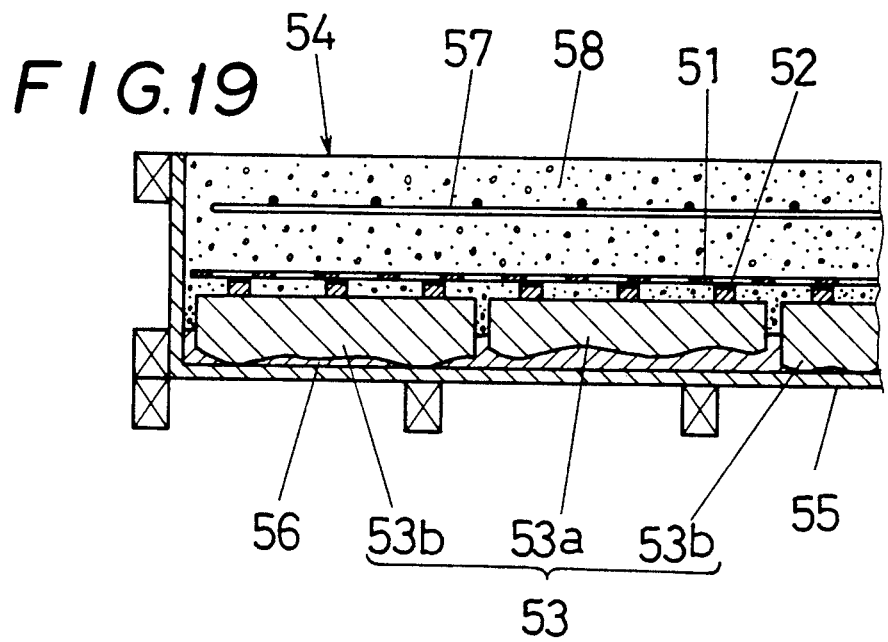
FIG. 19 is a cross sectional view for a portion in which the decorative material attached with the support shown in FIG. 18 is placed in a form.

The present invention will be explained next referring to an embodiment shown in FIGS. 18 and 19.

Stone materials 53 are arranged side by side to a mesh plate 51 by way of a spacer 52 and secured by blind-rivet 94 or by adhesive to form a mesh plate attached with the stone materials 53, which are encased with a form 54. Then, a joint filler agent 56, including a concrete non-cure material, is filled into a gap between a bottom plate 55 of a form 54 and the surface of the stone material 53. Since the mesh plate 51 is used, a relatively thin stone material 53a is suspended by thick stone materials 53b, 53b. Then, after incorporating concrete reinforcements 57, concrete 58 is placed thereon. Then, after normal temperature curing or steam curing, when the form is removed and the joint filler agent on the surface of the stone material 53 and the joint portion are flushed away, a patterned concrete block with unevenness of the stone material 53 can be obtained.

In this case, since the mesh plate is used, there is no requirement for using a spacer between it and the bottom plate of the form, even if relatively thin stone materials are present together. Further, if the size of the block is relatively small or the strength of the mesh plate is great, the reinforcements can be saved.

Example 9

Explanation will now be made to the embodiment shown in FIGS. 20 and 21. A decorative material 60 (tile, stone, etc.) having a concrete non-cure material layer 56 attached to the surface is appended to the surface of a collecting sheet 59 (made of paper, synthetic resin film, cloth, etc.), and joint materials 61 made of a foamed synthetic resin are set therein. A mesh plate 51 is fixed by blind-rivet 94 or by adhesive to the rear face of the decorative material 60 by way of a spacer 52 (or by anchors of the tiles). A height controlling spacer 64 comprises a support cylinder 62 and a bolt 63 is set at an appropriate portion of the joint portion of decorative material 60. The decorative material 60, etc. are encased within a form 54 and, after adjusting the height between the bottom plate 55 of the form 54 and the mesh plate 51 by means of the bolt 63, concrete reinforcements 57 are incorporated therein and then concrete 58 is placed therein. Then, after curing the concrete by a customary means, the form is removed and washed with water to remove the concrete non-cure material layer and the joint materials, the bolt is removed and the joint portion is added to obtain a concrete block structure attached with decorations.

Since the height of the mesh plate is controlled in this embodiment, it has a merit that the decorative material does not directly constitute a support.

Example 10

Figure 23:
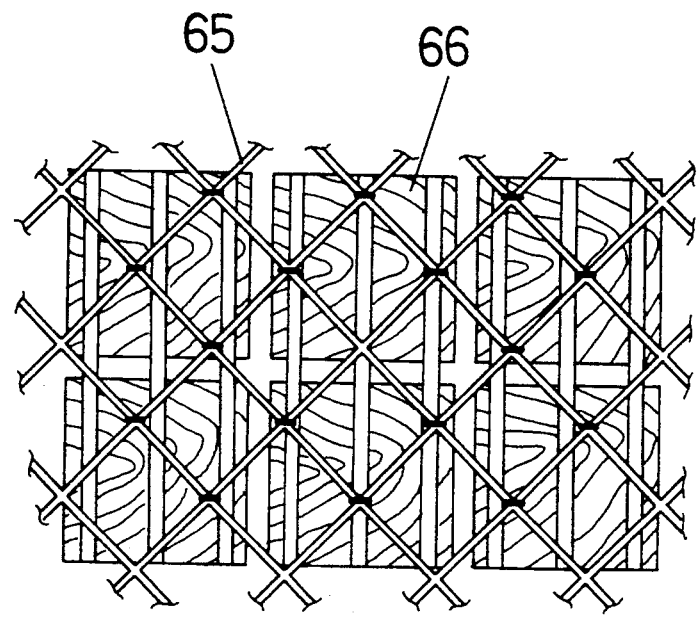
FIG. 23 is a plan view thereof.
Figure 24:
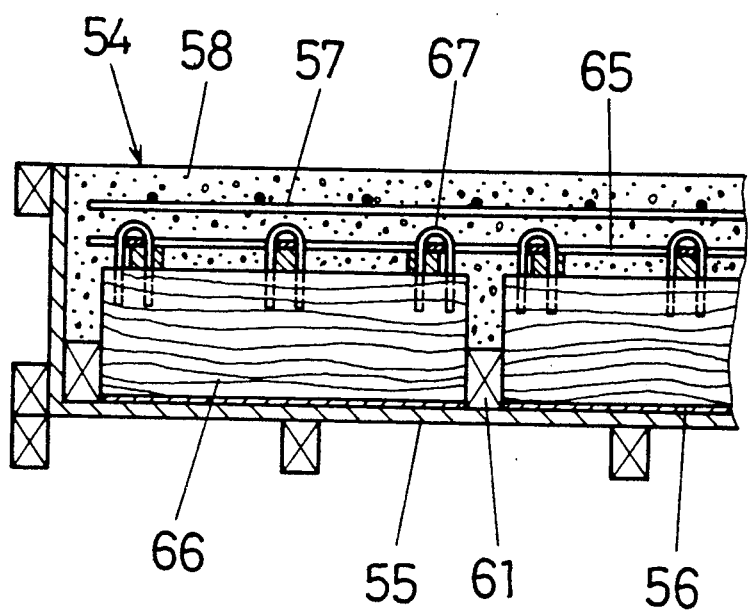
FIG. 24 is a cross sectional view for a portion thereof placed in a form.

Explanation will then be made to an embodiment as shown in FIGS. 22 through 24.

An expansion metal 65 and a wooden block 66 disposed at its surface with a concrete non-cure material layer 56 are secured by means of a U-shaped nail 67 which is set in a form 54. Then, after filling joint materials or joint filler agents 61, reinforcements 57 are incorporated and concrete 58 is placed thereon. After appropriately treating the concrete with a normal temperature cure, steam cure, etc., the form is removed after the cure of the concrete, and then the concrete non-cure material and the joint materials are removed, and a concrete block with wood grain decoration can be obtained. In this embodiment, an expansion metal 65 alternatively may be replaced by a steel mesh, a resin mesh, a carbon mesh, or a glass fiber collective lot mesh.

In a case of using a wooden block in the prior art, the stability has been poor and a cement paste deposited on the surface of wooden block, which can not be removed easily. However, in accordance with the present invention, wooden blocks can be arranged reliably and fine wood grains can be exposed with no worry of intrusion of the cement paste into the wood grains.

Example 11

Figure 25:
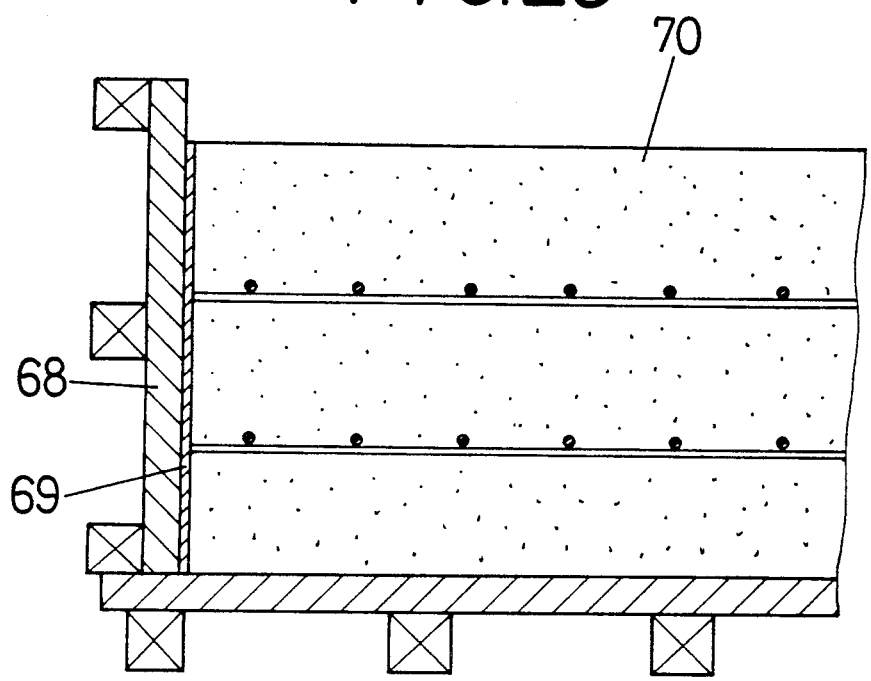
FIG. 25 is a cross sectional view of an embodiment forming a joint surface.
Figure 26:
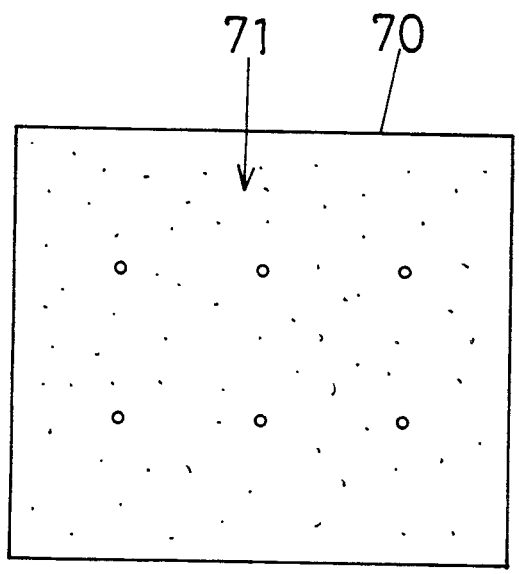
FIG. 26 is a side elevational view upon removal of the form thereof.
Figure 27:
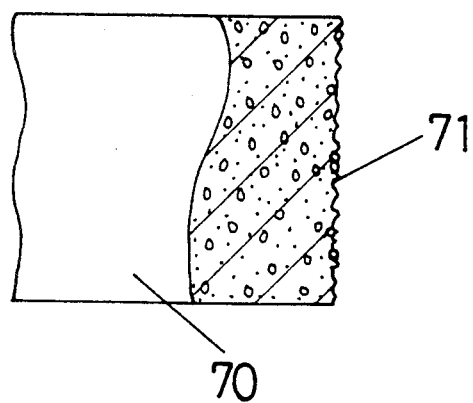
FIG. 27 is a front elevational view for a portion after the removal of the form and water washing thereof.

The present invention will be explained referring to an embodiment shown in FIGS. 25 through 27.

In this embodiment, a concrete joint surface is previously formed as roughened surface. A concrete non-cure material layer 69 is formed on the inner surface of a form 68 at a portion corresponding to a concrete joint surface and then concrete 70 is placed thereon. Then, when the form 68 is removed and the joint surface 71 washed with water to removed the uncured concrete, an uneven roughened surface of, for example, about 5 mm thickness is formed. Accordingly, if concrete is placed thereon without applying uneven fabrication, such as to impart unevenness to the joint surface upon initiation of the joint, old and fresh concretes can be joined firmly and integrally. In this embodiment, a form 68 alternatively may be replaced by a form having a gravel pattern.

Although the explanations have been made for the joint surface, the process can be applied also to the adhesion of another article to the wall surface of a concrete building structure, by which the concrete building structure and decorative material or other articles to be adhered can be firmly integrated and secured by means of concrete.

The concrete joint surface has been roughened mechanically and applied with roughening fabrication so as to increase the adhesion between the concrete joint surface and adding concrete, decorative materials or other articles in the prior art. In the present invention, however, there is no additional requirement of applying such a roughening fabrication and it has the effect of saving time and labor.

Example 12

Figure 28:
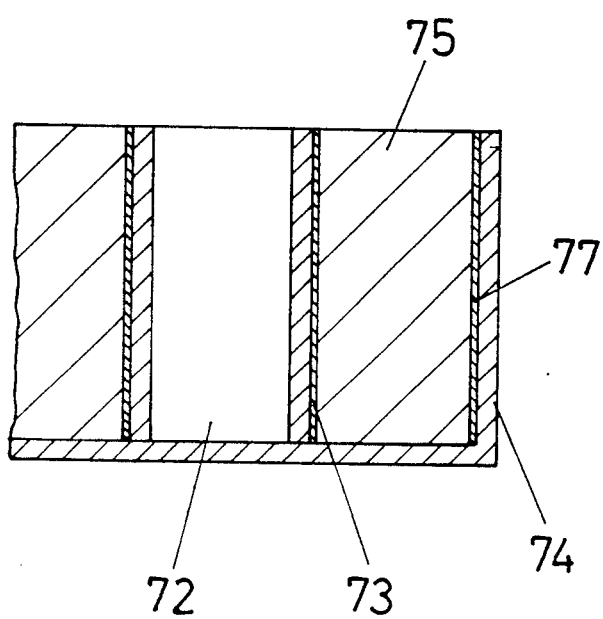
FIG. 28 is a cross sectional view for a portion in an intermediate step of another embodiment.
Figure 29:
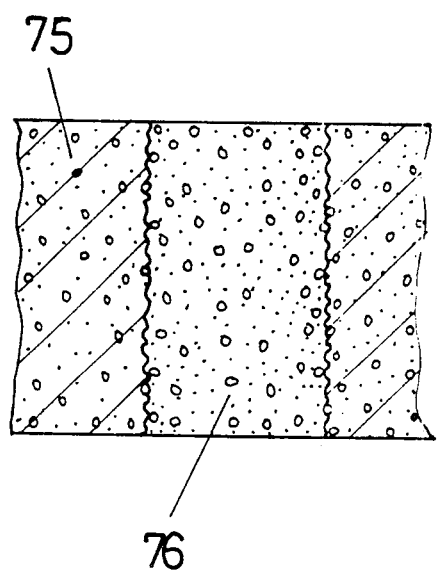
FIG. 29 is a cross sectional view for a portion after removal of a form and water washing thereof.

The present invention will be explained next referring to an embodiment shown in FIGS. 28 and 29.

This embodiment shows the case of forming a vacant hole at the inside of a concrete structure. Such a vacant hole has been used, for example, for fitting to connect one end of a rod-like article afterward to the concrete structure which has usually been formed as a tapered hole for facilitating the removal of a form. Further, since there is no appropriate means for roughening the wall surface in the vacant hole, connection with the rod-like article has been insufficient.

In this embodiment, a concrete non-cure material layer 73 is disposed to the outer wall of a cylindrical form 72, which is set at an appropriate portion in a form 74 situated at the outer circumference. Then, concrete 75 is placed between the form 74 and the cylindrical form 72. After the cure of the concrete 75, when the form 74 is removed, the inside of the hole removed with the cylindrical form 72 is washed with water and the uncured concrete is removed, a vacant hole 76 having a roughened inner wall surface can be obtained. A vacant hole 76 of an optional cross sectional shape can be obtained depending on the shape of the form 72 such as a cylindrical or square cylindrical form. Further, the material used for conventional forms, such as paper, wood, metal or synthetic resin, may be used for the cylindrical form 72. If required, a concrete non-cure material layer 77 may also be disposed to the dinner wall of the form 74.

In this embodiment, a cylindrical vacant hole 76 with a cross sectional area equal in the upper and the lower ends and with a roughened surface can be formed easily throughout the concrete structure.

Example 13

Figure 30:
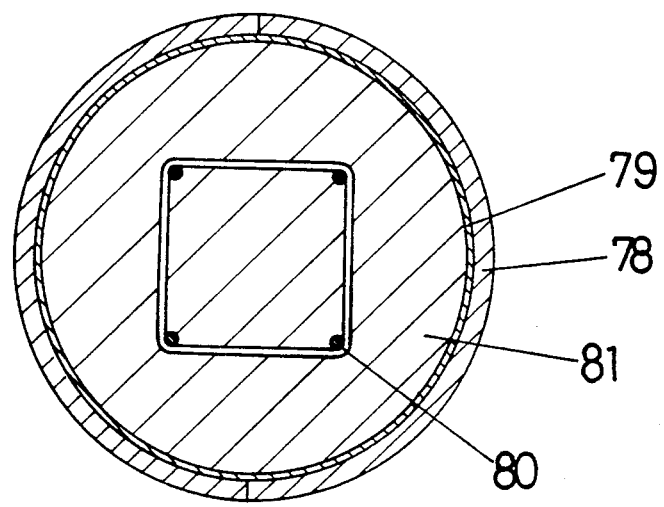
FIG. 30 is a cross sectional view for a portion in the intermediate step in another embodiment.
Figure 31:
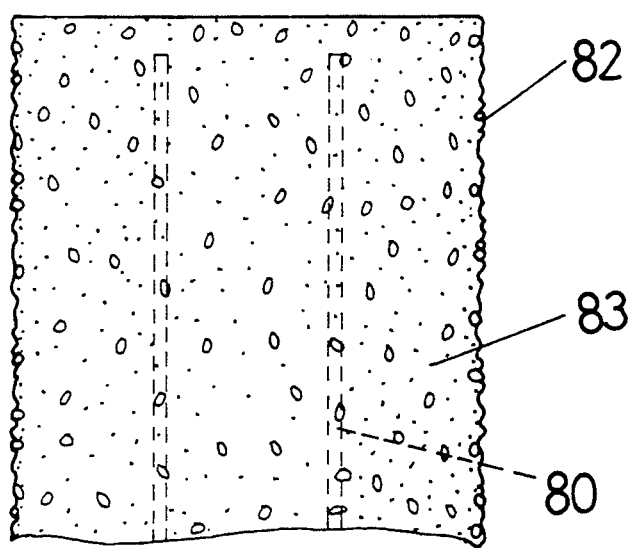
FIG. 31 is a cross sectional view for a portion after the removal of the form and water washing thereof.

The present invention will now be explained referring to other embodiments shown in FIGS. 30 through 32.

In this embodiment, a concrete post having a roughened outer wall surface is molded, in which the cross sectional shape of the concrete post can optionally be selected, for example, as a cylindrical or square shape. That is a concrete non-cure material layer 79 is disposed to the inner wall surface of a cylindrical form 78 and, after incorporating reinforcement 80 to the inside, concrete 81 is placed therein. After the cure of the concrete 81, when the form 78 is removed and the outer wall of concrete cylindrical post is washed with water to remove uncured concrete, a cylindrical post 83 having a roughened outer wall surface 82 can be obtained.

Figure 32:
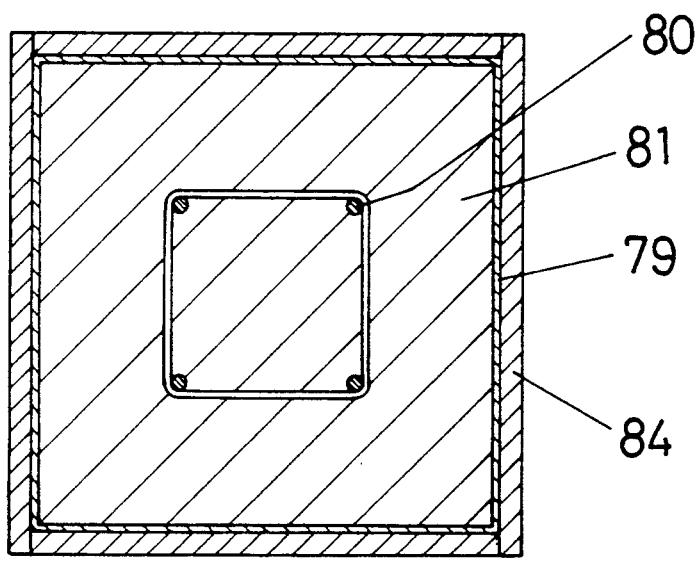
FIG. 32 is a cross sectional view in the intermediate step of an embodiment having a square cross section.

FIG. 32 shows a modified embodiment using a form 84 of a square cross section and the production process is identical with the case of using the cylindrical form as described above.

Example 14

Figure 33:
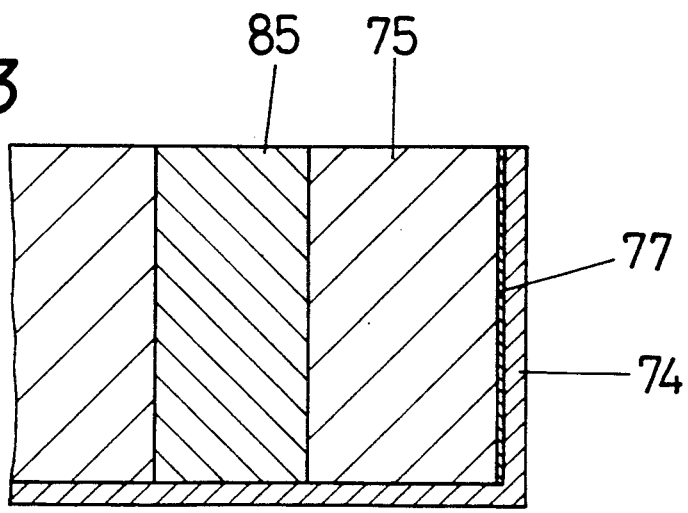
FIG. 33 is a cross sectional view for a portion in the intermediate step of another embodiment.
Figure 34:
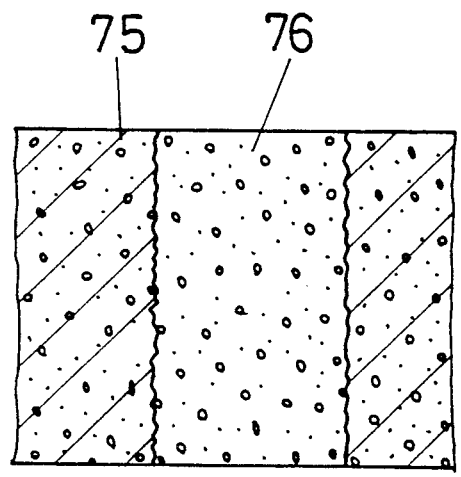
FIG. 34 is a cross sectional view for a portion after disposing a cavity for piping space thereof.

The present invention will be explained referring to an embodiment shown in FIGS. 33 and 34. In this embodiment, a cavity for the space of a pipeway is disposed to a concrete structure after curing. In Example 12 described previously, a vacant hole is disposed to the inside of a concrete structure by disposing the concrete non-cure material layer 73 to the outer wall of the cylindrical form 72.

In this embodiment, a concrete non-cure material is mixed with sand and sand particles coated with the concrete non-cure material, then mixed with concrete and compressed and cured to form a composite material 85, which is set at an appropriate portion in a form 74 disposed to the outer circumference. Concrete 75 is then placed between the form 74 and the composite material 85. After curing the concrete 75, the form 75 is removed and the concrete composite material 85 is crushed, by which a cavity 76 for the piping space having a shape of the composite material 85 can be perforated.

This embodiment utilizes the fact that an easily pulverizable concrete can be prepared by mixing sand particles coated with the concrete non-cure material layer and concrete, and then compressing and curing them. There is no particular restriction for the grain size of said sand particles.

In the embodiment shown in Example 12, since the inside of the cylindrical form 72 is vacant and the material of the form 72 is made of paper, wood, metal or synthetic resin, the specific gravity of the cylindrical form is different from that of the concrete 75. Accordingly, even if the cylindrical form 72 is provisionally attached to the frame 74, there is disadvantage, for example, that the cylindrical form 72 rises upwardly in the step of adding the concrete 75 thereto. In view of the above, a care has to be taken in order to accurately dispose a cavity for the piping space to a desired position of the concrete structure, for example, the provisional attachment has to be made strictly. However, in this embodiment, since the specific gravity of composite material 85 is the same as that of the concrete 75, a disadvantage, such as rising of the form 72, can be prevented.

Figure 35:
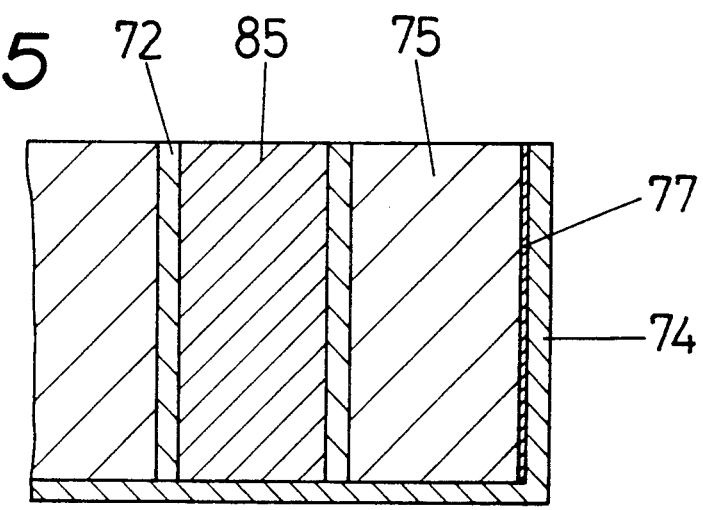
FIG. 35 is a cross sectional view for a portion in an intermediate step of another embodiment.
Figure 36:
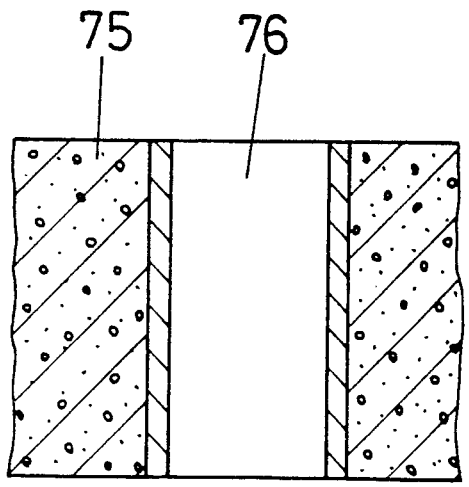
FIG. 36 is a cross sectional view for a portion after pulverization in a cylindrical form thereof.

The alternative embodiment can be adopted as shown in FIGS. 35 and 36. In this case, a concrete non-cure material is mixed with sand and sand particles coated with the concrete non-cure material are mixed with concrete and compressed and filled into the cylindrical form 72, so that composite material 85 is formed and cured in the cylindrical form 72. Then, after setting the cylindrical form 72 to an appropriate portion in a form 74 disposed to the outer circumference, concrete 75 is placed between the form 74 and 72. After curing the concrete 75, the form 74 is removed and the concrete composite material 85 solidified in the cylindrical form 72 is crushed, by which a cavity 76 for the piping space having a shape of the cylindrical form 72 can be perforated.

In this embodiment, the cross sectional shape of the cavity 76 is optional such as a cylindrical or square cylindrical shape depending on the shape of the form 72.

Example 15

This example shows a case of producing a concrete structure with surface decoration or patterning not requiring a form such as a pavement or horizontal decorative surface.

Aa concrete non-cure material is mixed with sand or gravel and sand particles or gravel coated with the concrete non-cure material are scattered by an appropriate amount to the surface of concrete placed on a horizontal plane before the cure of the concrete. After the cure of the concrete, when the surface of the concrete is washed with water, the scattered sand particles or gravel are thoroughly removed by flushing and a concrete structure with surface decorations or patterning can be produced easily.

Example 16

Figure 37:
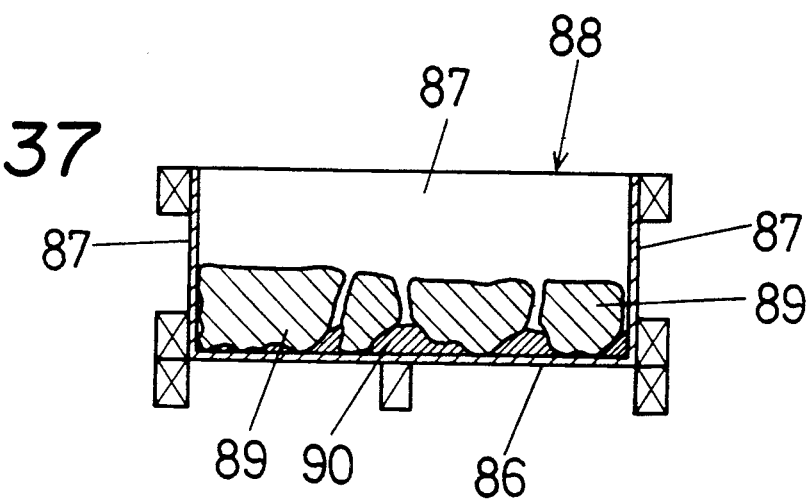
FIG. 37 is a cross sectional view before placing concrete in the processing step of another embodiment according to the present invention.
Figure 38:
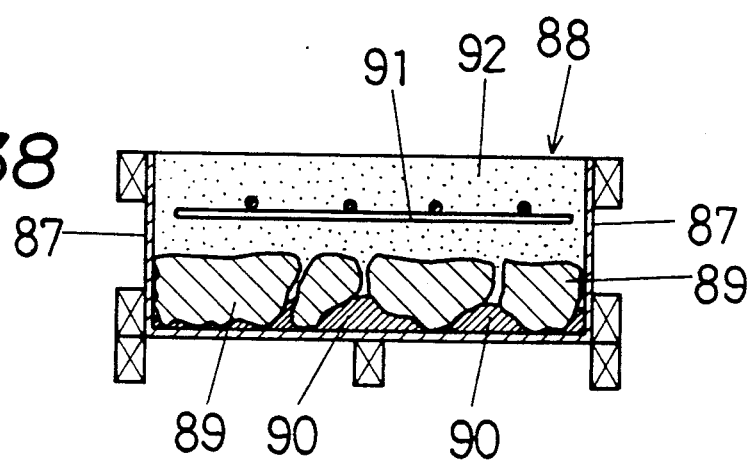
FIG. 38 is a cross sectional view after placing the concrete.
Figure 39:
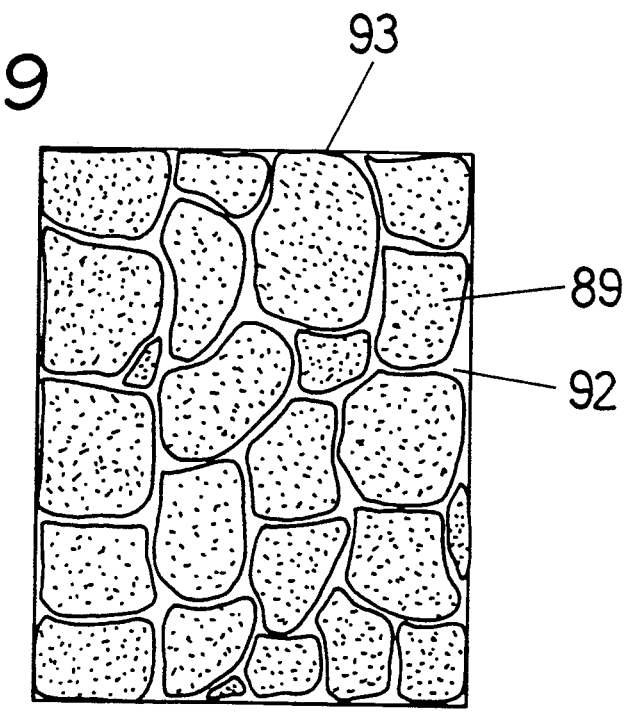
FIG. 39 is a plan view of the product thereof.

The present invention will not be explained referring to an embodiment shown in FIGS. 37 through 39. On a bottom plate 86 of a box-like form 88 comprising side plates 87, 87 vertically disposed on four sides of the bottom plate 86, decorative stone materials 89, 89 of relatively large thickness are arranged at an appropriate distance and an embedding agent 90 which is made by mixing a sodium silicate as the main agent with an inorganic acidic salt as a curing agent, including a reinforcing agent, and then mixing the resultant mixture with the powdered concrete non-cure material according to the aforementioned Example 1, is grouted or filled in the gaps between each of the stone materials 89, 89.

The protruding amount of the stone materials 89, 89 is determined depending on the grouting amount and the agent is grouted by an appropriate amount under visual observation (up to a position lower than the upper surface of the stone material). Steel reinforcements 91 are assembled above the stone material 89 at an appropriate distance. Then, a concrete 92 is placed into the form 88. After applying normal temperature curing or steam curing as it is, the form is removed and, when the obstacles and embedding agent at the surface of the stone material 89 are washed with pressurized water, a concrete block 93 with decoration from which the stone material 89, 89 are protruded, can be obtained.

Example 17

An unsaturated alkyd made of maleic anhydride and propylene glycol is dissolved into 2-hydroxyethyl methacrylate in a ratio of 60 to 40 by weight. 100 ppm of hydroquinone and 5,000 ppm of 6% copper naphthenate is then added into the resultant mixture so that an unsaturated polyester resin is obtained. The hydroquinone and the copper naphthenate control the speed of the production process. The hydroquinone acts to delay the speed of reaction, whereas the copper naphthenate acts to accelerate the speed. A curing agent such as 1 weight percent of 55% methyl ethyl ketone peroxide is added to said unsaturated polyester resin and the resultant mixture is hardened to obtain a concrete non-cure material of the present invention.

In this example, the aforementioned unsaturated alkyd is comprised of maleic anhydride and propylene glycol. Other unsaturated alkyds, comprised of phthalic anhydride and propylene glycol or isophthalic acid and propylene glycol can be used for preparing the concrete non-cure material of the present invention.

The dissolving ratio of the aforementioned unsaturated alkyd to 2-hydroxyethyl methacrylate is not restricted to the aforementioned ratio. According to the experiments of the inventor of the present invention, the weight ratio of between 60 to 40 and 70 to 30 of the unsaturated alkyd to the 2-hydroxyethyl methacrylate can be used to prepare the concrete non-cure material of the present invention. When the concrete non-cure material of this example is used in the methods as described in the following examples, the depth of the exposed decorations on the surface of the cured cement mortar or concrete, after the concrete non-cure material and uncured concrete are washed out, changes according to the change of the dissolving ratio of the unsaturated alkyd to the 2-hydroxyethyl methacrylate within the aforementioned scope from 60 to 40 to 70 to 30 by weight. Also, a styrene monomer can be added into this composition and, in this case, the dissolving ratio of the unsaturated alkyd to the 2-hydroxyethyl methacrylate to styrene monomer is 60 to 30 to 10.

Further, in this example, 1 weight percent of 55% methyl ethyl ketone peroxide is added to the unsaturated polyester resin for preparing the concrete non-cure material of the present invention. The preferred concrete non-cure material can be obtained by adding 55% of methyl ethyl ketone peroxide in a ratio of 1 to 5 weight percent with the aforementioned unsaturated polyester resin. According to the inventor's experiments, when 55% methyl ethyl ketone peroxide is added in amounts more than 5 weight percent, it does not influence or affect the curing.

When the concrete non-cure material according to this example is used for preparing concrete products or a concrete structure having surface decorations, such as described the previous examples, it is used as a layer of a concrete non-cure material which is made by adding 55% methyl ethyl ketone peroxide with the aforementioned unsaturated polyester resin and hardening the resultant liquid by means of coating or spraying.

Also, the concrete non-cure material according to this example can be used in the form of powder. In this case, a powdered concrete non-cure material is scattered in an appropriate amount on the concrete which is not yet cured, so that it can be utilized also in a case of not using a form (for example, a pavement with surface decoration, horizontal decorative or patterning surface, etc.). This powdered concrete non-cure material is also used by mixing with a water soluble adhesive or with an adhesive, and then drying or hardening by means of coating or spraying as is disclosed in Example 7.

Further, the concrete non-cure material according to this example can be used by hardening sand particles or gravel coated on the surface by the concrete non-cure material as described in Examples 15 and 16.

What is claimed is:

1. A concrete non-cure material for preventing the surface of cement mortar, which maintains contact with said concrete non-cure material, from setting or hardening:

wherein said concrete non-cure material is a polymer having a high water absorption which is made from mixing propylene glycol with maleic anhydride and either phthalic anhydride or isophthalic acid, dissolving the resultant unsaturated alkyd into 2-hydroxyethyl methacrylate in a weight ratio of 60 to 40 or 70 to 30, adding 100 ppm of hydroquinone and 5,000 ppm of 6% copper naphthenate into the resultant mixture, mixing 55% methyl ethyl ketone peroxide with the resultant liquid.

2. A concrete non-cure material for preventing the surface of cement mortar, which maintains contact with said concrete non-cure material, from setting or hardening:

wherein said concrete non-cure material is a powdered polymer having a high water absorption which is made from mixing propylene glycol with maleic anhydride and either phthalic anhydride or isophthalic acid, dissolving the resultant unsaturated alkyd into 2-hydroxyethyl methacrylate in a weight ratio of 60 to 40 or 70 to 30, adding 100 ppm of Hydroquinone and 5,000 ppm of 6% copper naphthenate into the resultant mixture, mixing 55% methyl ethyl ketone peroxide with the resultant unsaturated polyester resin, and hardening the resultant liquid.

3. A concrete non-cure material for preventing the surface of cement mortar, which maintains contact with said concrete non-cure material, from setting or hardening:

wherein said concrete non-cure material is made from coating a surface of sand particles or gravel with a polymer having a high water absorption and hardening said coated sand particles or gravel, said polymer having a high water absorption is made from mixing propylene glycol with maleic anhydride either phthalic anhydride or isophthalic acid, dissolving the resultant unsaturated alkyd into 2-hydroxyethyl methacrylate in a weight ratio of 60 to 40 or 70 to 30, adding 100 ppm of hydroquinone and 5,000 of 6% copper naphthenate into the resultant mixture, and mixing 55% methyl ethyl ketone peroxide with the resultant unsaturated polyester resin.

4. A concrete non-cure material claimed in claim 2 wherein said concrete non-cure material is made from powdering said polymer having a high water absorption, mixing the resultant powdered polymer with a water soluble adhesive or with an adhesive, coating or spraying the resultant mixture on a form, and then drying or hardening.

5. A concrete non-cure material comprises an embedding agent which is removed by water washing:
wherein said embedding agent comprises a mixture of sodium silicate, a curing agent with reinforcing agent incorporated therein and a powdered polymer having a high water absorption which is made form mixing propylene glycol with maleic anhydride and either phthalic anhydride or isophthalic acid, dissolving the resultant unsaturated alkyd into 2-hydroxyethyl methacrylate in a weight ratio of 60 to 40 or 70 to 30, adding 100 ppm of hydroquinone and 5,000 ppm of 6% copper naphthenate into the resultant mixture, mixing 55% methyl ethyl ketone peroxide with the resultant unsaturated polyester resin, and hardening the resultant liquid.

* * * * *